(12) United States Patent
Murphy

(10) Patent No.: US 6,408,564 B1
(45) Date of Patent: Jun. 25, 2002

(54) FISHING ROD COVER SYSTEM

(76) Inventor: Robert E. Murphy, 625 Spring St., P.O. Box 192, Clearwater, MN (US) 55320-0192

( * ) Notice: Subject to any disclaimer, the term of this patent is extended or adjusted under 35 U.S.C. 154(b) by 0 days.

(21) Appl. No.: 09/620,837

(22) Filed: Jul. 21, 2000

(51) Int. Cl.⁷ .............................................. A01K 97/08
(52) U.S. Cl. ...................................................... 43/26
(58) Field of Search ..................... 43/26; 206/315.11, 206/317; 224/922; 220/326, 323

(56) References Cited

U.S. PATENT DOCUMENTS

| | | | | |
|---|---|---|---|---|
| 1,352,238 A | * | 9/1920 | Arthur | 220/326 |
| 1,813,769 A | * | 7/1931 | Riha | 220/326 |
| 2,473,977 A | * | 6/1949 | Tutton | 206/315.11 |
| 2,953,277 A | * | 9/1960 | Weltman | 220/326 |
| 3,349,512 A | * | 10/1967 | Walker | 43/26 |
| 3,811,216 A | * | 5/1974 | Sauey et al. | 43/26 |
| 4,171,588 A | * | 10/1979 | Hoffman et al. | 43/26 |
| 4,222,193 A | * | 9/1980 | Beck | 43/26 |
| 4,643,302 A | * | 2/1987 | Baumgardner | 206/315.11 |
| 4,916,852 A | * | 4/1990 | Zebleckis | 43/26 |
| 4,967,504 A | * | 11/1990 | Craft | 43/26 |
| 5,046,279 A | * | 9/1991 | Smith et al. | 43/26 |
| 5,277,306 A | * | 1/1994 | Sargent | 43/26 |
| 5,293,711 A | * | 3/1994 | Robinson | 43/26 |
| 5,341,590 A | * | 8/1994 | Hepworth et al. | 43/26 |
| 5,417,339 A | * | 5/1995 | Liu | 220/326 |
| 5,425,194 A | * | 6/1995 | Miller | 43/26 |
| 5,515,641 A | * | 5/1996 | D'Alessandro | 43/26 |
| 5,640,795 A | * | 6/1997 | Wambolt | 43/26 |
| 5,967,315 A | * | 10/1999 | Langtry, II | 206/315.11 |

FOREIGN PATENT DOCUMENTS

| | | | | |
|---|---|---|---|---|
| DE | 812885 B1 | * | 7/1949 | 220/326 |
| GB | 255348 B1 | * | 7/1926 | 220/323 |

* cited by examiner

*Primary Examiner*—Darren W. Ark

(57) ABSTRACT

A fishing rod cover system for protecting the fishing rod from damage and for reducing entanglement of the fishing line during nonuse. The inventive device includes an elongate cover having an upper opening and a lower opening, a pair of catch members attached to the elongate cover adjacent the lower opening, and an attaching member catchably attachable to the catch members. The elongate cover is formed to receive the elongate shaft of a fishing rod without damaging the shaft. The attaching member is formed to snugly engage the distal end of the handle of the fishing rod opposite of the shaft for retaining the cover about the shaft of the fishing rod. The attaching member includes a first strap and a second strap each having a plurality of nubs that are catchably inserted within the catch members for retaining the attaching member upon handle of the fishing rod.

5 Claims, 5 Drawing Sheets

FISHING ROD COVER SYSTEM

BACKGROUND OF THE INVENTION

1. Field of the Invention

The present invention relates generally to fishing rods and more specifically it relates to a fishing rod cover system for protecting the fishing rod from damage and for reducing entanglement of the fishing line during nonuse.

2. Description of the Prior Art

Fishing rods have been in use for years. Typically, a fishing rod is comprised of a handle portion, an elongated flexible shaft extending from the handle portion, a reel attached to the handle portion, a plurality of eyelets attached to the elongated flexible shaft, and a length of fishing line extending from the reel through the eyelets.

Conventional fishing rods are very susceptible to damage from sunlight, accidental physical contact, or other engagements with the fishing rods which can damage the elongated flexible shaft and handle. In addition, fishing rods are susceptible to having the fishing line becoming entangled with adjacent fishing rods or other objects making it extremely difficult to utilize the fishing rod immediately. Another problem with conventional fishing rods is that fishing lures attached to the fishing line can accidentally engage individuals or can be snagged upon obstacles surrounding the fishing rod.

Examples of patented fishing rod covers include U.S. Pat. No. 4,222,193; U.S. Pat. No. 4,916,852; U.S. Pat. No. 4,967,504; U.S. Pat. No. 5,293,711; U.S. Pat. No. 5,341,590; U.S. Pat. No. 5,515,641; U.S. Pat. No. 5,277,306; and U.S. Pat. No. 5,640,795 which are all illustrative of such prior art.

While these devices may be suitable for the particular purpose to which they address, they are not as suitable for protecting the fishing rod from damage and for reducing entanglement of the fishing line during nonuse. Conventional fishing rods are susceptible to becoming damaged and engaging surrounding objects during nonuse.

In these respects, the fishing rod cover system according to the present invention substantially departs from the conventional concepts and designs of the prior art, and in so doing provides an apparatus primarily developed for the purpose of protecting the fishing rod from damage and for reducing entanglement of the fishing line during nonuse.

SUMMARY OF THE INVENTION

In view of the foregoing disadvantages inherent in the known types of fishing rod protective devices now present in the prior art, the present invention provides a new fishing rod cover system construction wherein the same can be utilized for protecting the fishing rod from damage and for reducing entanglement of the fishing line during nonuse.

The general purpose of the present invention, which will be described subsequently in greater detail, is to provide a new fishing rod cover system that has many of the advantages of the fishing rod protective devices mentioned heretofore and many novel features that result in a new fishing rod cover system which is not anticipated, rendered obvious, suggested, or even implied by any of the prior art fishing rod devices, either alone or in any combination thereof.

To attain this, the present invention generally comprises an elongate cover having an upper opening and a lower opening, a pair of catch members attached to the elongate cover adjacent the lower opening, and an attaching member catchably attachable to the catch members. The elongate cover is formed to receive the elongate shaft of a fishing rod without damaging the shaft. The attaching member is formed to snugly engage the distal end of the handle of the fishing rod opposite of the shaft for retaining the cover about the shaft of the fishing rod. The attaching member includes a first strap and a second strap each having a plurality of nubs that are catchably inserted within the catch members for retaining the attaching member upon handle of the fishing rod.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fishing rod cover system that will overcome the shortcomings of the prior art devices.

A second object is to provide a fishing rod cover system for protecting the fishing rod from damage and for reducing entanglement of the fishing line during nonuse.

Another object is to provide a fishing rod cover system that protects the fishing rod from breakage.

An additional object is to provide a fishing rod cover system that reduces fishing line entanglement.

A further object is to provide a fishing rod cover system that prevents a fishing lure from engaging an object or individual.

Another object is to provide a fishing rod cover system that prevents the eyelets from bending or breaking.

A further object is to provide a fishing rod cover system that reduces the likelihood of engaging an individual or object with the narrow end of the fishing rod.

Another object is to provide a fishing rod cover system that is easy to install and remove from various shapes and sizes of fishing rods.

An additional object is to provide a fishing rod cover system that enables a fisherman to retain their fishing lures upon the fishing line during nonuse of the fishing rod.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become filly appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
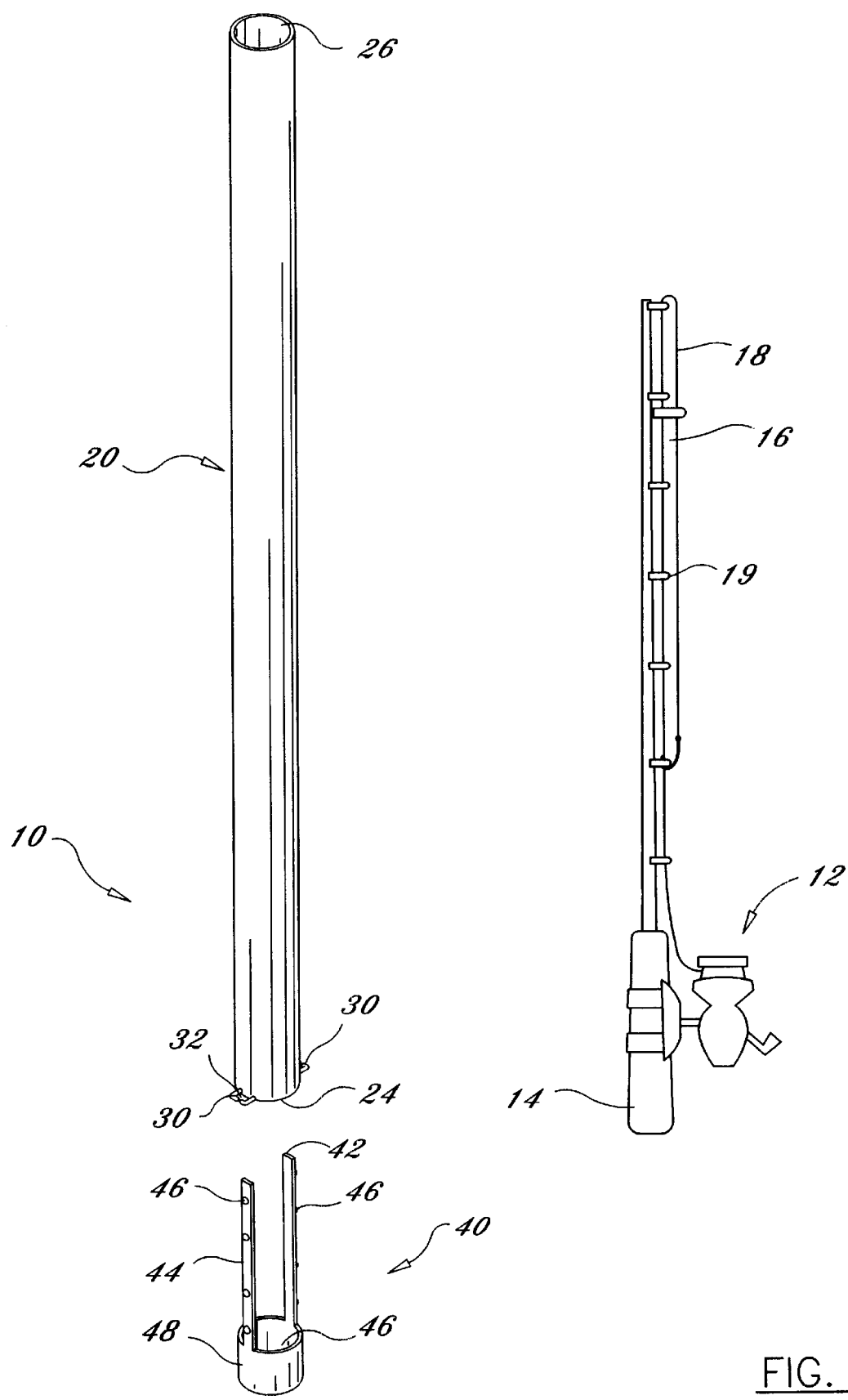
FIG. 1 is an exploded upper perspective view of the present invention.

Turning now descriptively to the drawings, in which similar reference characters denote similar elements throughout the several views, FIGS. 1 through 8 illustrate a fishing rod cover system 10, which comprises an elongate cover 20 having an upper opening 22 and a lower opening 24, a pair of catch members 30 attached to the elongate cover 20 adjacent the lower opening 24, and an attaching member 40 catchably attachable to the catch members 30. The elongate cover 20 is formed to receive the elongate shaft 16 of a fishing rod 12 without damaging the shaft 16. The attaching member 40 is formed to snugly engage the distal end of the handle 14 of the fishing rod 12 opposite of the shaft 16 for retaining the cover 20 about the shaft 16 of the fishing rod 12. The attaching member 40 includes a first strap 42 and a second strap 44 each having a plurality of nubs 46 that are catchably inserted within the catch members 30 for retaining the attaching member 40 upon handle 14 of the fishing rod 12.

Figure 3:
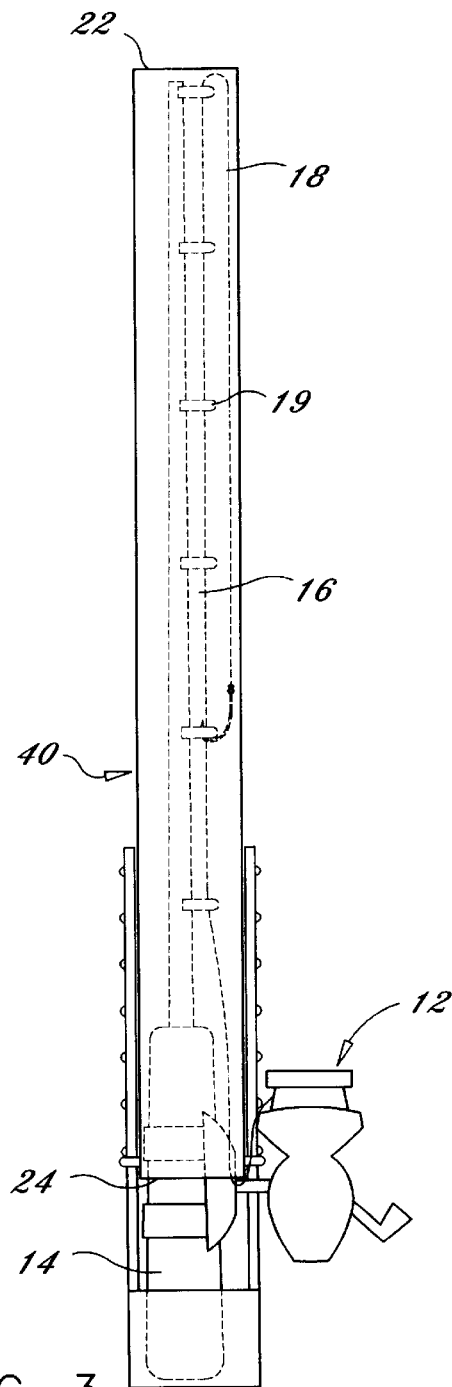
FIG. 3 is a side view of the present invention attached about a conventional fishing rod.
Figure 4:
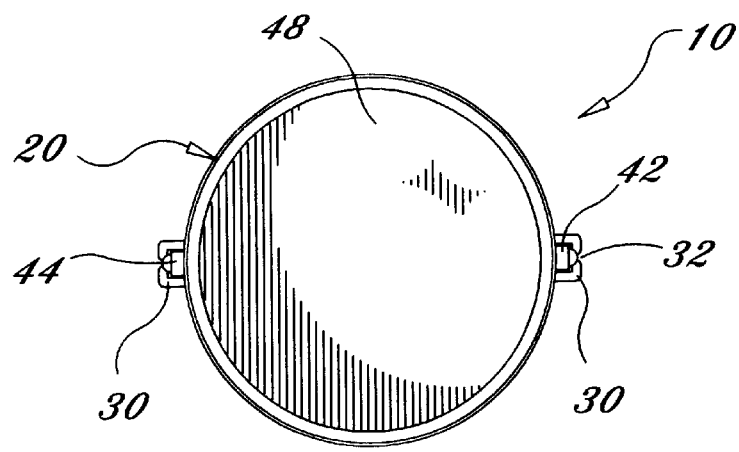
FIG. 4 is a top view of the present invention showing the upper open end.
Figure 5:
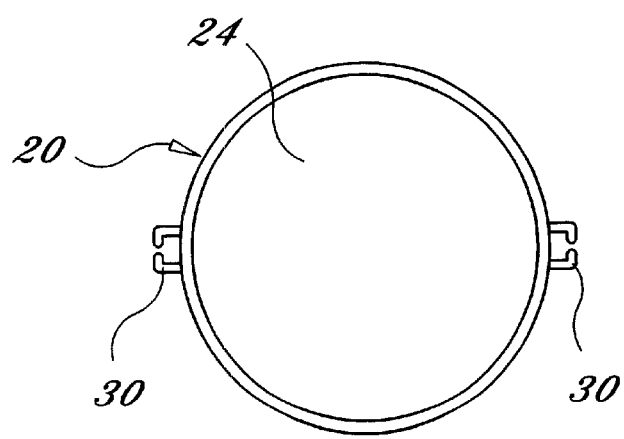
FIG. 5 is a bottom view of the main tube showing the lower open end.

As shown in FIGS. 1 and 3 of the drawings, a conventional fishing rod 12 is typically comprised of a handle 14, an elongate flexible shaft 16 extending from the handle 14 in a longitudinal manner, a plurality of eyelets 19 attached to the shaft 16, a reel attached to the handle 14, and a length of fishing line 18 stored within the reel and extending through the eyelets 19. The reel of the conventional fishing rod 12 allows the user to draw in or extend the fishing line 18 with respect to the fishing rod 12.

As shown in FIGS. 1, 2, 3 and 6 of the drawings, the cover 20 is an elongate tubular structure. The cover 20 has a length sufficient to fully or partially enclose the shaft 16 of the fishing rod 12. The cover 20 has a lumen sufficient to comfortably receive the elongate shaft 16, eyelets 19 and any fishing lures of the fishing rod 12. The cover 20 has a lower opening 24 and an upper opening 22 as shown in FIGS. 1 through 5 of the drawings. The shaft 16 of the fishing rod 12 is typically inserted through the lower opening 24 of the cover 20.

As best shown in FIG. 1 of the drawings, the cover 20 preferably has a circular cross sectional area. However, it can be appreciated that various other well-known cross sectional shapes may be utilized to construct the cover 20 such as but not limited to square, rectangular, triangular and oval. FIG. 9 illustrates the usage of an oval shaped cover 20.

The cover 20 is preferably constructed of a lightweight resilient material such as but not limited to plastic or metal.

Figure 6:
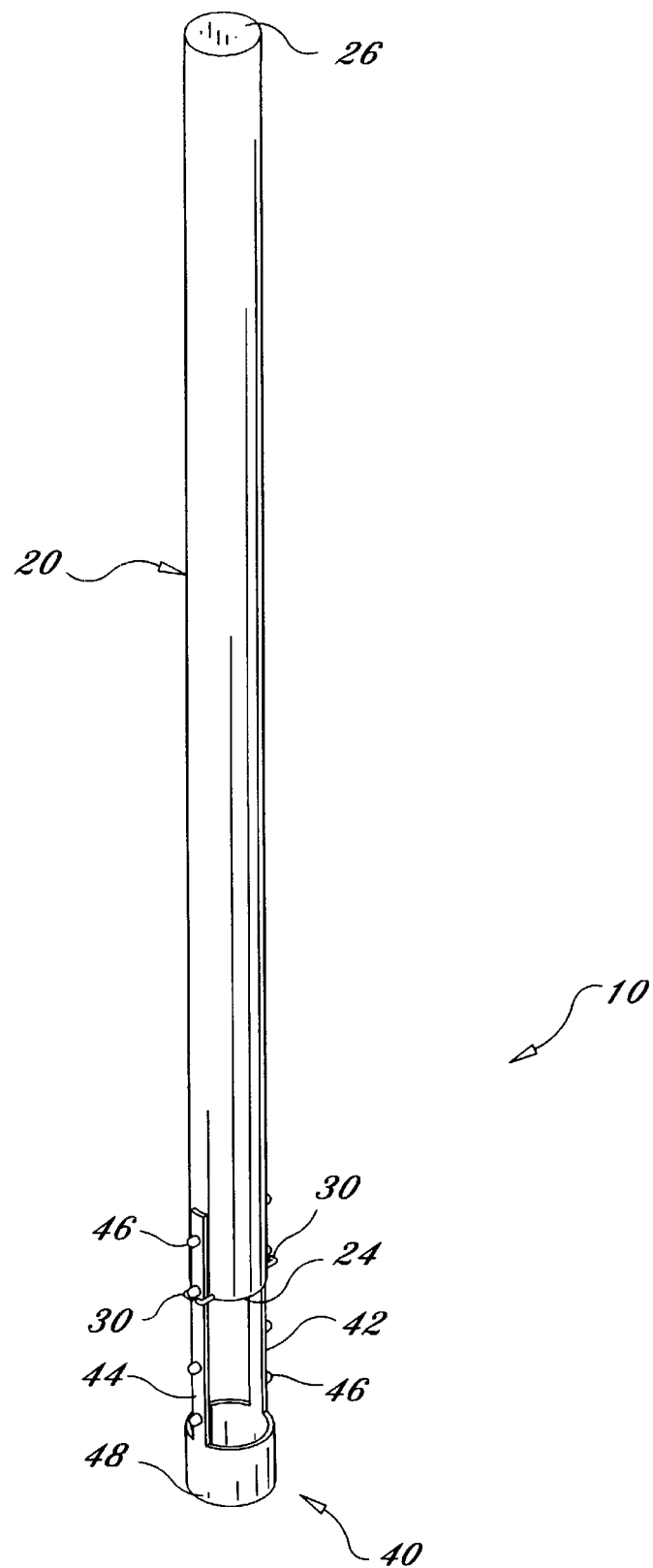
FIG. 6 is an upper perspective view of an alternative embodiment of the present invention showing an enclosed end.

As shown in FIG. 6 of the drawings, in an alternative embodiment of the present invention the cover 20 includes an enclosed end 26 instead of an upper opening 22. The enclosed end 26 prevents debris from entering the cover 20 and prevents objects within the cover 20 from escaping the cover 20.

Figure 7:
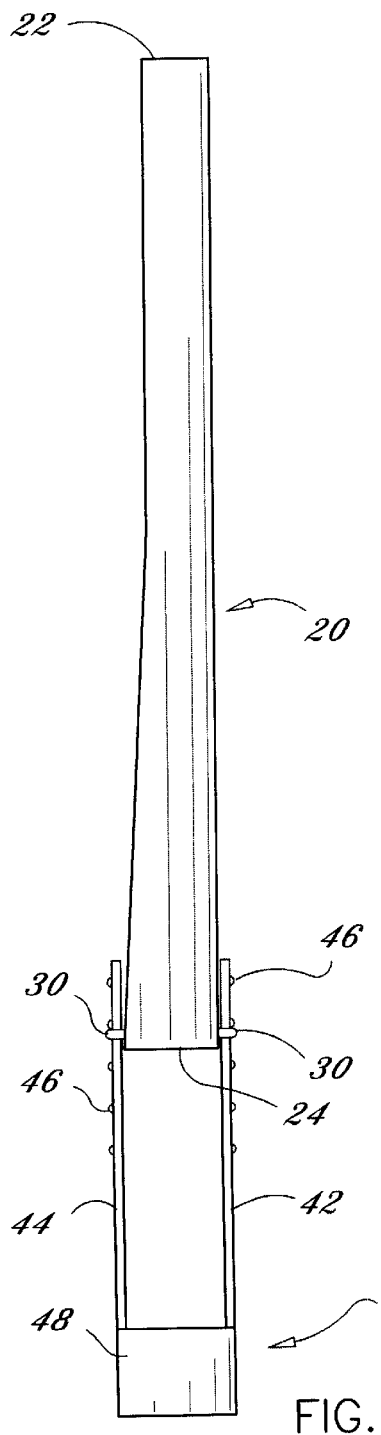
FIG. 7 is a side view of a first alternative embodiment of the present invention.

As shown in FIG. 7 of the drawings, in a second alternative embodiment of the present invention the lower opening 24 is broader than the upper opening 22. As further shown in FIG. 7 of the drawings, the cover 20 tapers inwardly from the lower opening 24 toward the central portion of the cover to receive and accommodate larger eyelets 19 near the base of the fishing rod 12. Various other well-known cross sectional shapes may be utilized to construct the cover 20 such as but not limited to square, rectangular, triangular and oval.

Figure 8:
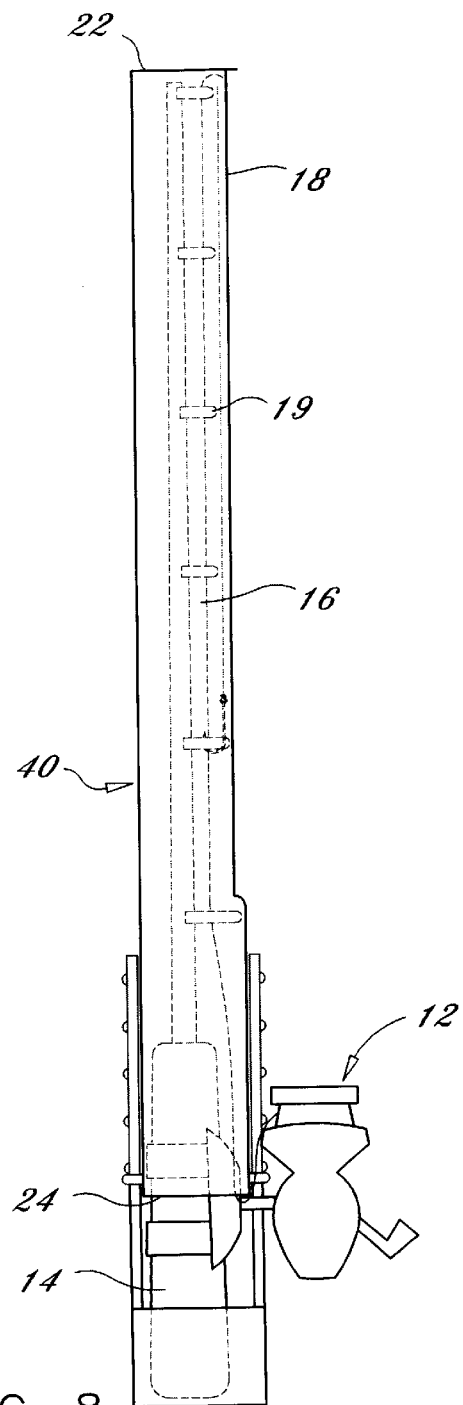
FIG. 8 is a side view of a second alternative embodiment of the present invention.

As shown in FIG. 8 of the drawings, in a third alternative embodiment of the present invention the lower opening 24 is broader than the upper opening 22 as with the second alternative embodiment for receiving larger eyelets 19 of the fishing rod 12 near the base. As further shown in FIG. 8, the cover 20 of the third alternative embodiment includes a consistent sized cover 20 from the lower opening 24 which then becomes narrower a distance along the cover 20 toward the upper opening 22 for receiving the larger eyelets 19 of the fishing rod 12.

As shown in FIGS. 1 through 6 of the drawings, a plurality of catch members 30 are attached to the cover 20 adjacent the lower opening 24 for receiving the attaching member 40. There are preferably two catch members 30 attached to the cover 20, however it can be appreciated that one or more may be utilized upon the cover 20. The catch members 30 have a U-shaped structure with a central opening 32 for receiving the straps 42, 44 of the attaching member 40. Each of the catch members 30 preferably includes a central slot extending into each of the catch members 30 for allowing the nubs 46 of the straps 42, 44 to pass through easily.

As shown in FIGS. 1 and 6 of the drawings, the attaching member 40 is comprised of an end cap 48, a first strap 42 and a second strap 44. As shown in FIG. 3 of the drawings, the end cap 48 is formed for receiving the distal end of the hand opposite of the shaft 16. The end cap 48 is preferably circular in shape, however various other shapes and structures may be utilized to construct the end cap 48.

Figure 2:
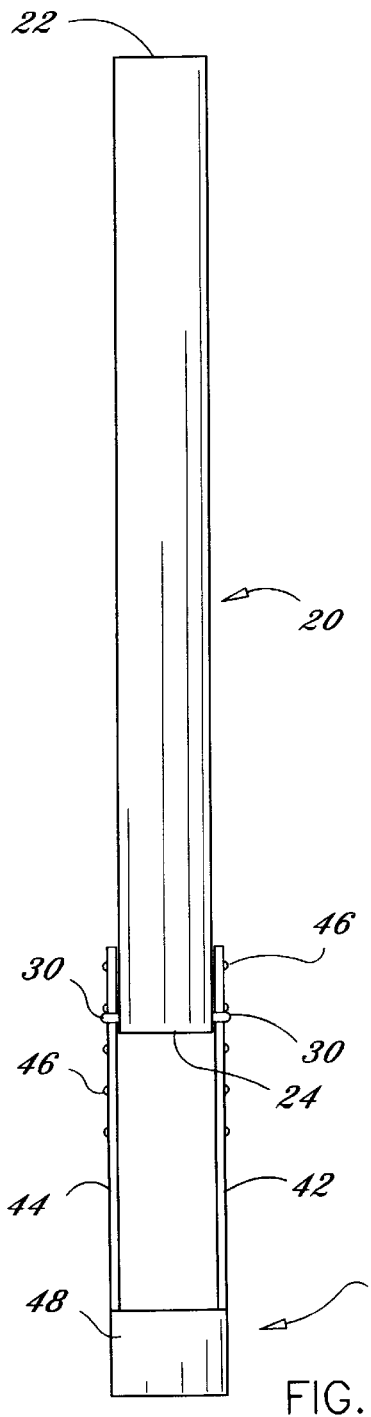
FIG. 2 is a side view of the present invention.

The straps 42, 44 are extendible through the catch members 30 and each include a plurality of nubs 46. The straps are an elongated structure as best shown in FIGS. 2 and 3 of the drawings. The straps 42, 44 are preferably formed from a resilient material. The straps 42, 44 may be constructed of an elastic material to adjust to various sizes of fishing rods 12.

In use, the user positions the cover 20 over the shaft 16 of the fishing rod 12 through the lower opening 24 of the cover 20 until the cover 20 is adjacent the reel of the fishing rod 12 as shown in FIG. 3 of the drawings. The user then positions the attaching member 40 about the handle 14 of the fishing rod 12 so that the end cap 48 is adjacent the distal end of the handle 14 of the fishing rod 12. The user then inserts the straps 42, 44 through the catch members 30 until the end cap 48 is retained snugly against the distal end of the handle 14 thereby retaining the cover 20 and the attaching member 40 upon the fishing rod 12. When the user desires to utilize the fishing rod 12, the user simply removes the attaching member 40 from the handle 14 of the fishing rod 12 and removes the cover 20 from about the shaft 16 of the fishing rod 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing rod cover system, comprising:

an elongate tubular cover having a first end and a second end formed for fitting about a shaft of a fishing rod above a reel of said fishing rod, wherein said first end is open;

an attaching member formed for receiving and engaging a distal end of a handle of said fishing rod;

a plurality of elastic straps each comprising a flat structure having a first flat surface and a second flat surface wherein said first flat surface faces outwardly, and wherein said plurality of elastic straps extend from said attaching member along an axis substantially parallel to a longitudinal axis of said elongate tubular cover when the attaching member and elongate tubular cover are attached together;

a plurality of nubs extending from said first flat surface of each of said plurality of elastic straps;

a plurality of catch members secured to said first end of said elongate tubular cover for catchably receiving said plurality of elastic straps; and a flat slot within each of said plurality of catch members for snugly receiving said plurality of elastic straps.

2. The fishing rod cover system of claim 1, wherein said second end is open.

3. The fishing rod cover system of claim 1, wherein each of said plurality of catch members has a U-shaped structure defining said flat slot.

4. The fishing rod cover system of claim 1, wherein each of said plurality of catch members includes a center opening for allowing said plurality of nubs to catchably pass through.

5. The fishing rod cover system of claim 1, wherein said attaching member is comprised of a tubular cap structure having an open end and a closed end opposite thereof.

* * * * *